Patented Apr. 19, 1949

2,467,442

UNITED STATES PATENT OFFICE 2,467,442

PROCESS FOR THE PRODUCTION OF KETOGULONIC ACID

Johan Overhoff and Hendrik Willem Huyser, Amsterdam, Netherlands, assignors to Nederlandsche Centrale Organisatie Voor Toegepast-Natuurwetenschappelijk Onderzoek, The Hague, Netherlands No Drawing. Application April 6, 1946, Serial No. 660,300. In the Netherlands November 9, 1943

Section 1, Public Law 690, August 8, 1946, Patent expires November 9, 1963

11 Claims. (Cl. 260—528)

This invention relates to a process for the production of ketogulonic acid by oxidation of sorbose with nitric acid.

It is known that ketogulonic acid can be prepared by the oxidation of sorbose by means of nitric acid. Hitherto relatively elevated temperatures have been employed in this process, viz. temperatures ranging from about 70 to 100° C. The known methods, however, proved to be not very suitable for execution on a technical scale, especially as a result of the very short duration of the reaction, which consequently permits only little latitude and constitutes a serious objection especially when working with larger quantities. Also the yields of ketogulonic acid were relatively low, due to the fact that under the oxidation conditions which were hitherto employed many by-products are formed.

According to the invention we have now found that more favourable results, especially as regards the yield of ketogulonic acid, are obtained when the oxidation of the sorbose is carried out with nitric acid of a concentration between about 30 and 65% at temperatures below about 25° C., particularly in the range between —10 and +25° C. Preferably a supplementary quantity of nitrous acid is present in the reaction medium in addition to the nitrous acid which may be formed from the nitric acid.

The temperature range preferably employed lies between about —5 and +20° C.

By carrying out the oxidation in this manner not only higher yields of ketogulonic acid are obtained, but also less undesirable by-products are formed, the working up of the oxidation mixture being thus considerably facilitated.

It is true that the duration of the reaction in the process according to our invention is in general somewhat longer than when working at higher temperatures, but this longer duration of the reaction is fully compensated by the higher yields of the desired product and the more easy method of working up the reaction mixture. In view thereof the process according to our invention from an economic point of view is far preferable to the processes hitherto proposed.

The concentrations of nitric acid employed according to our invention vary between about 30 and 65% and are higher than those which were in general hitherto employed. Such high concentrations would be absolutely unsuitable for working at relatively elevated temperatures, since the sorbose would then be decomposed to too great an extent, a circumstance which is not to be feared at the lower temperatures used according to our invention.

In our process the concentrations of nitric acid in the reaction medium may be maintained with advantage considerably in excess of 40% by weight, up to about 65% by weight. This is surprising, when considering that the application of nitric acid concentrations of for example 65% at the reaction temperatures currently used hitherto results in a complete or substantial destruction of the initial sorbose.

It is advantageous in the process according to our invention that apart from the nitrous acid which is normally formed by the oxidation reaction from the nitric acid, a supplementary quantity of nitrous acid is present in the reaction medium, preferably from the very beginning of the reaction. We have found that the reaction then proceeds regularly from the beginning, whilst moreover a good control of the course of the reaction is possible during the whole duration of the reaction. When carrying out the reaction in the absence of a supplementary quantity of nitrous acid, the course of the reaction cannot be kept so well in hand, because on the one side after bringing together the reaction components no perceptible reaction takes place for some time; which causes a considerable loss of time especially at lower temperatures, whilst on the other hand the reaction, after having begun with evolution of nitrous gases, has such a violent and at higher temperature even explosive character, that an accurate control is often very difficult.

The presence of a supplementary quantity of nitrous acid in the reaction medium may be accomplished in any suitable manner. For this purpose a nitrite, such as sodium nitrite, may for example be added or nitrogen dioxide or nitrous gases may be introduced into the liquid. Substances can also be added which react easily with nitric acid under formation of nitrous acid.

The quantity of supplementary nitrous acid to be added may vary within wide limits, depending on the other reaction conditions, such as temperature, nitric acid concentration, and the like, which are employed. When adding an alkali metal nitrite the quantity to be employed generally ranges from 2 to 50% of the weight of the sorbose to be oxidised.

In order to regulate the solubility of the nitrous acid in the reaction medium it may be advantageous to carry out the oxidation under increased or reduced pressure.

Furthermore we have found that it is recommendable to apply in the oxidation an excess of nitric acid with regard to the sorbose, higher yields of ketogulonic acid being obtained thereby. Preferably a quantity of 2 to 4 mols HNO3 per mol of sorbose to be converted is employed. Very favourable results are obtained when using about 3 mols HNO3 per mol of sorbose.

The nitric acid necessary for the oxidation reaction can be added all at once or gradually or in portions.

During the course of the reaction the nitric acid concentration gradually decreases, inter alia by the formation of water of reaction. Owing to this a part of the favourable effect attained by the use of more concentrated nitric acid might be lost again.

According to a special embodiment of the process according to our invention this objection is removed by at first not adding all the required nitric acid in the concentration desired during the reaction, but beginning the oxidation only with a part of the required nitric acid and bringing the remaining part during the progress of the reaction either in portions or continuously with increasing concentration into the reaction medium.

The nitrous vapours which are developed during the oxidation may advantageously be absorbed in nitric acid and the resulting nitrous acid-containing mixture utilised in the oxidation process.

Since when carrying out the oxidation under the special reaction conditions of the present invention the formation of undesirable by-products is considerably reduced, a relatively pure reaction mixture is obtained, from which the 1-keto-2-gulonic acid can be isolated in a simple manner. In principle this method of isolation consists in separating the ketogulonic acid in the form of an alkali metal salt in an alcoholic medium from the crude reaction mixture.

For this purpose the crude oxidation product may be neutralised by adding an alkali metal hydroxide, carbonate or bicarbonate, an alcohol, preferably methyl alcohol or ethyl alcohol being added, either previously, simultaneously or afterwards. The neutralisation is effectively carried out with an alkali metal hydroxide in the form of alcoholic lye.

We have found that in the neutralisation of the crude oxidation product in an alcoholic medium to a pH of about 6.5 to 7 a relatively pure alkali metal ketogulonate separates from the solution. It could not be expected that in this manner a relatively pure alkali metal salt of ketogulonic acid could be obtained in a single operation, in view of the fact that the crude oxidation product comprises several by-products, including various organic acids. The alkali metal salts thereof and also the inorganic salts (alkali metal nitrate and alkali metal nitrite) formed in the neutralisation, now proved, quite surprisingly, under the prevailing conditions, to remain practically completely in solution; as a result an isolation of the desired ketogulonate in a pure condition, if necessary after recrystallisation, is possible.

Following examples illustrate the process according to our invention, without however being restricted thereto.

*Example 1*

100 grams of sorbose are dissolved in a mixture of 150 ccs. of nitric acid (sp. gr. 1.4) and 150 ccs. of water. To the solution which is kept at 5° C. 13 grams of sodium nitrite are added and the reaction mixture is maintained for 15 days at 5° C. Then the solution is neutralised with calcium carbonate and, after filtration, the solution is diluted with such a quantity of methyl alcohol that the calcium salt of ketogulonic acid is precipitated. The ketogulonic acid is now converted into ascorbic acid in known manner by boiling with hydrochloric acid. In the resulting solution the ascorbic acid is determined by titration, whereby it is found that 33.4 grams of ketogulonic acid are present. The oxidation of the sorbose has thus proceeded for 31 mol per cent in the desired direction.

*Example 2*

500 grams of sorbose are dissolved in a mixture of 500 ccs. of nitric acid (sp. gr. 1.4) and 500 ccs. of water. To this solution 65 grams of sodium nitrite are added slowly whilst stirring vigorously, the temperature of the solution being constantly maintained at 0° C.

The solution is now kept for 35 days at 0° C., during which period a slow but regular development of nitrous gases takes place. Then the solution is neutralised at 0° C. with 725 ccs. of 30% sodium hydroxide solution and 6.8 litres of methyl alcohol are subsequently added. A white crystalline precipitate separates which consists of crude sodium ketogulonate and which after filtration and drying weighs 162.5 grams. After recrystallisation of the resulting product from water 115 grams of pure sodium ketogulonate are obtained which corresponds to a yield of 23% by weight of the initial sorbose.

*Example 3*

In the same way as that described in Example 2, 500 grams of sorbose are oxidized with nitric acid. The reaction temperature is now kept at 15° C. and the reaction terminated after 90 hours. Working up of the reaction mixture in the same manner as described in Example 2 yields 150 grams of crude product, from which 102 grams of pure sodium ketogulonate are obtained. The yield is 20.4% by weight, calculated on the sorbose.

*Example 4*

500 grams of sorbose are dissolved in a mixture of 450 ccs. of nitric acid (sp. gr. 1.4) and 500 ccs. of water. The reaction temperature is kept at 15° C. and the reaction terminated after 120 hours. The working up of the reaction mixture is carried out in the same manner as described in Example 2; the yield of pure ketogulonate amounts to 19.5% by weight, calculated on the sorbose.

*Example 5*

1000 grams of sorbose are dissolved in a mixture of 666 ccs. of nitric acid (sp. gr. 1.4) and 666 ccs. of water, 100 grams of sodium nitrite being added to this solution whilst stirring. The reaction mixture is now left standing for 18 hours, care being taken that the temperature of the solution remains at 15° C. After 18 hours 100 ccs. of nitric acid (sp. gr. 1.4) are added to the mixture whilst stirring, this operation being repeated three times, viz. 34, 49 and 64 hours after the beginning, but now with 50 ccs. of nitric acid. After a total duration of reaction of 90 hours the reaction liquid is neutralised and worked up, 1100 ccs. of 30% caustic soda lye being used for the neutralisation and 12 litres of methanol for the precipitation of the sodium salt. 280 grams of a white crystalline crude product are isolated from which 185 grams of pure sodium ketogulonate are obtained after recrystallisation. The yield is 18.5% by weight.

*Example 6*

The nitrous gases which are developed in Example 2, are introduced into 500 ccs. of nitric acid (sp. gr. 1.4) and the resulting acid is added to a solution of 500 grams of sorbose in 500 ccs. of water. The resulting mixture is brought to 20° C. and is kept 52 hours at this temperature. After working up in the above described manner 130 grams of crude product and 90 grams of pure sodium ketogulonate are obtained. The yield is 18% by weight.

What we claim is:

1. A process for the production of ketogulonic acid by oxidation of sorbose with nitric acid, wherein the oxidation is carried out with nitric acid of about 30–65% at temperatures below about 25° C.

2. A process according to claim 1, characterized in that the temperatures used range between about −10 and +25° C.

3. A process according to claim 1, wherein the oxidation is carried out at a temperature between −5 and +20° C.

4. A process according to claim 1, wherein a supplementary quantity of nitrous acid is present in the reaction medium, in addition to the nitrous acid which may be formed from the nitric acid.

5. A process according to claim 1, wherein 2 to 4 mols of $HNO_3$ are employed per mol of sorbose.

6. A process according to claim 5, characterized in that about 3 mols of $HNO_3$ are employed.

7. A process according to claim 1, wherein the oxidation is started only with a part of the required nitric acid, the remaining part of the acid being added to the reaction medium during the reaction with increasing concentration.

8. A process according to claim 7, characterized in that the said remaining part of the acid is added in portions.

9. A process according to claim 7, characterized in that the said remaining part of the acid is added continuously.

10. A process according to claim 4, characterized in that the supplementary quantity of nitrous acid in the reaction medium is obtained by adding alkali metal nitrite in a proportion of 2 to 50% of the weight of the sorbose.

11. A process according to claim 1, wherein the ketogulonic acid formed is separated from the oxidation product in the form of a salt by neutralisation in an alcoholic medium.

JOHAN OVERHOFF.
HENDRIK WILLEM HUYSER.

REFERENCES CITED

The following references are of record in the file of this patent:

UNITED STATES PATENTS

| Number | Name | Date |
|---|---|---|
| 2,190,377 | Dalmer et al. | Feb. 13, 1940 |
| 2,301,811 | Reichstein | Nov. 10, 1942 |
| 2,338,115 | Isbell | Jan. 4, 1944 |

FOREIGN PATENTS

| Number | Country | Date |
|---|---|---|
| 644,962 | Germany | May 19, 1937 |
| 183,450 | Switzerland | Apr. 15, 1936 |